United States Patent [19]

Cibie

[11] Patent Number: 4,620,267
[45] Date of Patent: Oct. 28, 1986

[54] CORRECTOR DEVICE FOR AUTOMATICALLY CORRECTING THE BEAM DIRECTION OF VEHICLE HEADLAMPS TO COMPENSATE FOR VARIATIONS IN VEHICLE TRIM

[75] Inventor: Pierre Cibie, Neuilly sur Seine, France

[73] Assignee: Cibie Projecteurs, France

[21] Appl. No.: 807,543

[22] Filed: Dec. 11, 1985

[30] Foreign Application Priority Data

Dec. 14, 1984 [FR] France ............................ 84 19172

[51] Int. Cl.[4] .............................................. B60Q 1/08
[52] U.S. Cl. ........................................ 362/71; 362/66; 340/97
[58] Field of Search ............... 362/66, 71, 61; 340/87, 340/89, 97

[56] References Cited

U.S. PATENT DOCUMENTS 3,634,677  1/1977  Wolffing-Seelig ............... 362/71
4,204,270  5/1980  d'Orsay ............................ 362/71

FOREIGN PATENT DOCUMENTS 2217944  9/1974  France .
7316164 11/1974  France ............................ 362/61

Primary Examiner—William A. Cuchlinski, Jr.
Assistant Examiner—Diana M. Cox
Attorney, Agent, or Firm—McCormick, Paulding and Huber

[57] ABSTRACT

The corrector device comprises at least one illumination sensor (10, a, b, c) integrated in a headlamp and fixed to move with the headlamp reflector (12), the sensor-reflector assembly normally pointing in such a direction as to detect the luminance of the road in at least one angular direction at a predetermined angle $(o+\phi+\theta)$ with the horizontal (OY), with processing means being provided that are suitable for generating a corrector signal which is a function of the luminance of the road in said direction, whenever the trim of the vehicle changes, the device further including at least one actuator controlled by said corrector signal in order correct the direction in which the reflector-sensor assembly is pointing.

30 Claims, 6 Drawing Figures

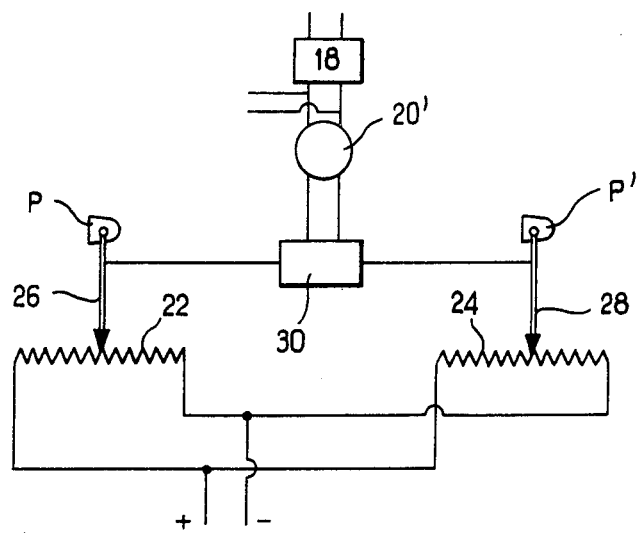
FIG_4
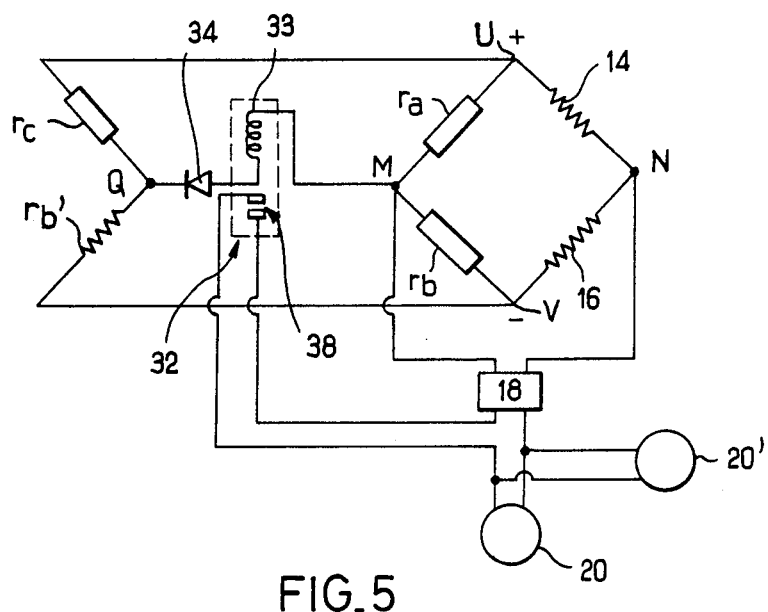
FIG_5

CORRECTOR DEVICE FOR AUTOMATICALLY CORRECTING THE BEAM DIRECTION OF VEHICLE HEADLAMPS TO COMPENSATE FOR VARIATIONS IN VEHICLE TRIM

The present invention relates to a device for automatically correcting the beam direction of a vehicle's headlamps when the beam direction is modified as a consequence of a change in the vehicle's trim.

BACKGROUND OF THE INVENTION

When a vehicle is manufactured, the beam direction of its headlamps is adjusted so that the headlamps illuminate the road adhead effectively without dazzling other road users, and as laid down in the Highway Code. In practice, the upper cutoff of a dipped headlamp beam points downwards in such a manner as to reach the ground at a point between 50 and 75 meters ahead of the vehicle.

However, when the vehicle is loaded, or accelerated or decelerated, the trim of the vehicle changes, and consequently the headlamp beam direction relative to the road also changes. The beam cutoff may be raised in which case other road users may be dazzled, or conversely the beam cutoff may be lowered in which case the headlamps do not illuminate far enough ahead.

It has long been the practice for some makes of car to be fitted with hydraulic or electrical devices for both statically and dynamically correcting the beam direction of headlamps. Generally speaking, such devices comprise: two sensors which permanently sense the distances between the vehicle body and the front and the rear wheels respectively of the vehicle; calculating means responsive to said sensors to generate a signal which is a function of the difference between said sensed distances; and an actuator controlled by said signal to point the headlamps in a new direction relative to the vehicle body such that the headlamp beam continues to point in the correct direction relative to the road.

However, such devices are complicated, bulky, and difficult to install. A considerable amount of space must be provided to receive the two sensors, the actuator, and the hydraulic ducts or electrical conductors which interconnect said items. In addition, these items increase vehicle weight and price.

Mention may also be made, by way of background, of published French patent specification No. 1 455 408 in the name of the pesent Applicant. Said French patent teaches a device for correcting the beam direction of vehicle headlamps by servocontrolling said direction as a function of the elevation of the headlamps of oncoming vehicles. The purpose of the correction is to adapt the direction in which the headlamp beams are pointed to the shape of the road (level or sloping up or down, etc.) each time a vehicle comes the other way in order to avoid dazzling the driver of said other vehicle, rather than to attempt compensating for variations in the trim of the vehicle on which the device is mounted.

Preferred embodiments of the present invention remedy the above-mentioned drawbacks by proposing a device for correcting the beam direction of vehicle headlamps, which device is simple in structure and occupies very little space.

SUMMARY OF THE INVENTION

The present invention provides a device for automatically correcting the beam direction of a vehicle headlamp when the trim of said vehicle changes, said device comprising:

an illumination sensor integrated in the vehicle headlamp and fixed to move therewith, said sensor being disposed to detect the luminance of the road in at least one direction at a predetermined angle with the horizontal, said luminance being detected in a region of the road lying in the field illuminated by the headlamp, and said sensor being suitable for generating a signal representative of said detected luminance;

an actuator for varying the inclination of the projector-sensor assembly relative to the vehicle; and processor means suitable for generating an actuator control signal as a function of the signal generated by said sensor, in such a manner as to servocontrol said region of the road to have constant luminance.

Thus, when the beam is properly pointed, the control signal generated by the processor means has no effect so that the actuator remains stationary and the beam direction does not change.

However, if the vehicle trim should change so that the beam direction is deflected downwardly (e.g. because of braking) the dipped headlamp beam will illuminate a region of the road which is closer to the vehicle. Since the direction in which luminance is detected will vary in the same way as the beam direction, the region in which luminance is detected is also moved closer to the vehicle. However, since the luminance of a point on the road varies as the square of the distance of that point from the light source, the luminance as detected by the sensor in this new region of the road will be greater than the initial luminance. The signal provided by the sensor will thus vary, and in this case it will increase. This variation of the signal relative to its initial value is observed by the processor means and a suitable control signal is generated thereby and applied to the actuator to cause the headlamp to pivot (or optionally to pivot only the reflector thereof) through a angle such that the beam direction returns to its original direction relative to the road.

Similar reasoning applies to the case where the beam is tilted upwardly, e.g. because of vehicle acceleration. As the beam rises, the automatic corrector acts to lower the beam to return it to its initial direction.

In the above explanation, variation in luminance at a point or region of the road is taken to be representative of variation in illumination in vertical planes since it is known that these two quantities vary in common.

Thus, a corrector device in accordance with the invention can be completely integrated within a headlamp. There is no need to use any external electrical or hydraulic circuit. The beam direction of the headlamp is servocontrolled as a function of variations in the luminance as detected by the sensor in a predetermined fixed direction relative to the headlamp. The corrector is thus lightweight, compact, cheap, and practically maintenance-free.

In a particular embodiment of the invention, the sensor is constituted by an objective lens (e.g. a converging lens) and by at least one photo-electric cell mounted in the image focal plane of said lens at the image point corresponding to said region whose luminance is to be detected. The converging lens and photoelectric cell assembly is fixed to move with the reflector of the headlamp, since in most types of car the headlamp per se is fixed relative to the bodywork and only the reflector is movable relative thereto.

However, a corrector device having only one photoelectric cell does not operate in an entirely satisfactory manner. It will readily be understood that even if the trim of the vehicle does not change, the luminance detected at the point or region under consideration may fluctuate due to variations in several different parameters, for example the intensity of the projected beam may vary, as may the reflection coefficient of the road, e.g. due to colored marks on the road or to puddles of water. Thus, if the voltage applied to the lamps increases, the detected luminance increases. The corrector device will interpret such an increase as though it were due to the vehicle trim being changed and will raise the beam to a new direction where it runs the risk of dazzling oncoming vehicle drivers.

In order to eliminate the effects of short term and local parameters on the detected luminance, the sensor advantageously includes a second photoelectric cell situated in the focal plane of the objective lens in such a manner that the lens forms thereon an image of the road in another direction at a second predetermined angle relative to the horizontal, corresponding to a second region of road which is considerably closer to the vehicle than the first, above-mentioned region of road.

In this case, the processor means responds to the ratio of luminance from the two selected directions. This ratio is independent of the inherent luminosity of the road and of the voltage applied to the lamps.

The processor means may be of any known kind, for example they may be electronic or they may include a microprocessor. In a particular embodiment, the processor means are constituted by a Wheatstone bridge having two adjacent branches constituted by the variable resistances of two passive photoelectric cells, which resistances are initially selected to be equal, and whose other two branches are constituted by two fixed resistors which are chosen in such a manner that when the beam direction is correct, the Wheatstone bridge is balanced, with the voltage across the measurement diagonal terminals of the Wheatstone bridge being applied to the input of an amplifier, and with the actuator being connected to the output from said amplifier.

If the trim of the car changes, the ratio of the illumination sensed by the photocells and thus the ratio of their resistances, will change. As a result the bridge is out of balance. An electric voltage appears across the measurement diagonal terminals of the bridge, and after amplification, this voltage controls the actuator so as to return the beam to the correct beam direction.

The above description concerns a corrector device associated with a single headlamp. However, since the luminance of the road depends on both vehicle headlamps, it is necessary to control the direction of said headlamps simultaneously. This could be done by using two actuators such as two independent steppers. If DC motors are used, one of them could be controlled both from the Wheatstone bridge and by a comparator capable of delivering an electrical votlage which is a function of the angular difference between the position of the second headlamp relative to the position of the first headlamp. The comparator may be constituted by two potentiometers connected as a Wheatstone bridge, with the sliders of said potentiometers being mechanically connected to rotate with respective headlamp reflectors, said sliders being electrically connected to the input terminals of an amplifier whose output is applied to the motor associated with the second headlamp.

The reference value of the luminance ratio from the two selected predetermined directions is preferably determined after the two headlamps have been put into equilibrium (either manually or automatically) relative to each other by means of the above-mentioned comparator circuit, while the automatic corrector device is turned off.

The above-described two-photocell corrector does not always operate correctly. If some random obstacle occurs on the road in the detection direction which corresponds to the more distant region of the road, the obstacle may cause said region to appear more luminous than it should. The illumination ratio between the two selected angular directions then increases suddenly causing the above-described device to raise the beam direction unnecessarily.

In order to remedy this situation, the corrector must be made insensitive to accidental variations in luminance. Calculations (shown in full below) demonstrate that for given variation in vehicle trim angle, the sensitivity of a sensor increases with increasing distance to the region of the road whose luminance is to be detected. Thus, sensitivity is particularly high in the first selected direction which corresponds to the further region of the road. In other words, there is a natural tendency for such equipment to exaggerate the above-mentioned drawback.

This leads to the improvement of measuring the luminance in a direction intermediate between the two above-mentionned directions, which corresponds to a region of the road located between said far region and said close region. For a given trim angle variation, the variation of luminance will be lower at said intermediate region that at the further region.

However, measuring the luminance in the intermediate region only is insufficient, in particular because the equipment is inherently less sensitive to the intermediate region than to the far region. And indeed, under normal road conditions where there are no obstacles on the road, it is in fact desirable to have a high degree of sensitivity.

Consequently, in an improved embodiment of the invention, the corrector device for correcting the beam direction includes a third photoelectric cell which is likewise mounted in the focal plane of the objective lens and at a position corresponding to the image of the road in a third direction which is at a predetermined angle to the horizontal and which corresponds to said intermediate region.

The processor means then need to take account of the luminance measured in said intermediate region. Here again, the processor means may be of the microprocessor type or of the electrical circuit type, for example the processor means may comprise a suitably improved Wheatstone bridge type of circuit. In order to do this, the junction point between the first two photoelectric cells is connected via a connection line including a relay to the junction point between the third photoelectric cell and a third resistor whose behavior is substantially identical to that of the resistor of the second cell, with the other ends being respectively connected to the terminals of the current feed diagonal of the Wheatstone bridge, and said relay opening an associated switch included in an electrical circuit connected in series with the actuator(s) and the output terminals from the amplifier, whenever current flows along said connection line from said first to said second junction points, with a diode being connected in series in said connection line in order to prevent current passing in the opposite direction. The resistance of the cell associated with the far region is chosen to be greater than the resistance of the cell associated with the near region.

The relationship between the angle of error and the ratio between the luminance from the far region and from the near region is not the same as the relationship between the angle of error and the ratio between the luminance from the intermediate region and the near region. As shown by detailed calculations below, the first ratio is greater than the second ratio and is equal to a multiple thereof. This relationship between the two ratios makes it possible to determine what the value of the first ratio ought to be given a knowledge of the second ratio, and it is thus possible to determine what the luminance ought to be from the far region. As soon as the processor means detects that the normal coefficient between the two ratios has been exceeded, an obstacle is assumed to be present in the far region, thereby causing its luminance to suddenly increase. Current then flows along the said connection line and is sufficient to cause the relay to open its switch, thereby switching off the actuators. The direction of the headlamp beam is not corrected. However, so long as the coefficient between the luminance ratios remains less than or equal to the normal value, said electrical circuit remains closed and the actuators are normally controlled by the output voltage from the amplifier.

In an advantageous embodiment of the invention, the three photoelectric cells are in the form of hortizontal and parallel elongate strips which coincide with the respective images of the three regions of the road as provided by the lens. Said regions are in the form of horizontal strips of road whose width is equal to the width of the lane being followed by the vehicle, which lie in said three predetermined directions respectively, and with said cells being of different widths to match the perspective of the road.

BRIEF DESCRIPTION OF THE DRAWINGS

Embodiments of the invention are described by way of example with reference to the accompanying drawings, in which:

FIG. 4 is a circuit diagram of the comparator for comparing the direction in which one reflector is pointing relative to the other reflector;

FIG. 5 is an electrical circuit diagram of a corrector device including three photoelectric cells.

MORE DETAILED DESCRIPTION

Figure 1:
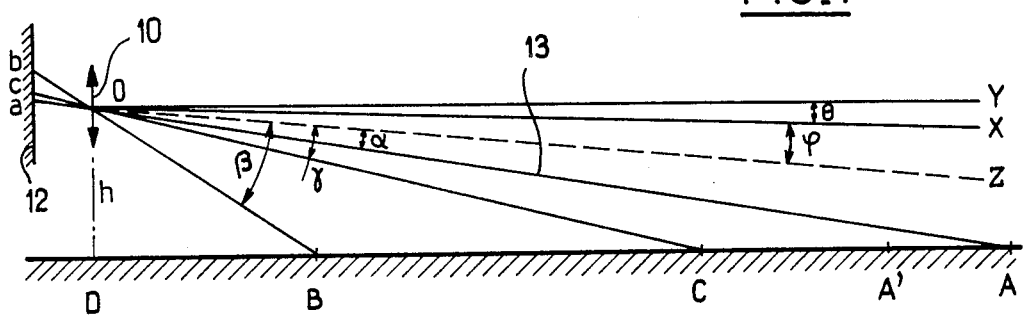
FIG. 1 is an optical diagram of a corrector device integrated in a headlamp and making use of three photoelectric cells.
Figure 2:
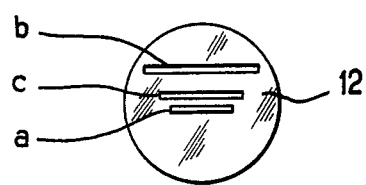
FIG. 2 is a front view of the headlamp reflector.

With reference to FIGS. 1 and 2, an automatic corrector device in accordance with the invention is integrated in the headlamp of a motor vehicle. The optics of the device include an illumination sensor constituted by an objective lens, which may be single converging lens 10, and a pivoting reflector 12 of the headlamps. The lens is fixed to pivot together with the reflector.

Three photoelectric cells are mounted on the reflector 12, said cells having photosensitive areas which are marked a, b, and c. In the example described below, these cells are passive type cells, i.e. they are constituted by photosensitive components whose electrical resistance varies in inverse proportion with the intensity of received light (i.e. they are photoresistors). Naturally, active cells could also be used, i.e. use could be made of cells which generate an electrical current or an electrical voltage which is proportional to the received illumination.

The cells a, c, and b are disposed on the reflector in such a manner as to coincide with respective images of three points A, C, and B of the road as formed on the reflector by the lens 10. The point A is preferably situated where the dipped beam cutoff (represented by a line 13) meets the road when the vehicle trim is normal, the point B is the closest point to the headlamp, and the point C is at an intermediate distance.

The points A, C, and B in FIG. 1 represent regions in the form of narrow strips lying across the road, with the width of the strip being equal to the width of the path followed by the vehicle. Similarly, as can be seen in FIG. 2, the photoelectric cells are likewise in the form of horizontal strips, with the width of the strips being equal to the width of the images of said regions A, C, and B of the road. The cells b, c, and a are smaller than one another in that order as a function of the perspective of the road as seen from the headlamp. In order to simplify the following description, reference continues to be made to "points" A, C, and B.

A system of axes is drawn in FIG. 1 in order to designate the positions of the points A, B, and C in angular terms, together with the angle of the vehicle trim and the beam direction of the headlamp. More precisely:

OY designates a horizontal axis which is fixed in time and space;

OX is an axis fixed to the vehicle, and when the headlamp is properly adjusted, the axis OX is horizontal and coincides with the axis OY. In FIG. 1, the vehicle is shown as having an abnormal trim so that the vehicle horizontal axis OX is at an angle $\theta$ relative to the true horizontal, in other words the angle YOX=$\theta$;

OZ is an axis connected to the headlamp. It may, for example, be constituted by the optical axis of the headlamp and its position is measured relative to the vehicle horizontal axis OX by an angle $\phi$, in other words the angle XOZ=$\phi$.

The positions of the points A, B, and C are marked by the angles $\alpha$, $\beta$, and $\gamma$ formed between the axis OX and the axes OA, OB, and OC respectively.

When a change in trim lowers the beam direction from A to A', the purpose of the invention is to pivot the reflector and hence its optical axis through such an angle as to completely compensate for the variation in the angle of trim, i.e. in the present example and as shown in FIG. 1 to rotate the reflector anticlockwise.

In accordance with the invention, the direction in which the vehicle headlamps point is controlled by actuators which are themselves controlled by signal processing means capable of comparing the ratios of the illumination detected by the photoelectric cells at said points A, B, and C, in the manner explained below.

The processor means may be of any known type, for example they may be constituted by a microprocessor. Although the following description describes an embodiment using an electric circuit, it should be understood that this example is not limiting and that the person skilled in the art may design any other suitable forms of embodiment for the processor means.

Figure 3:
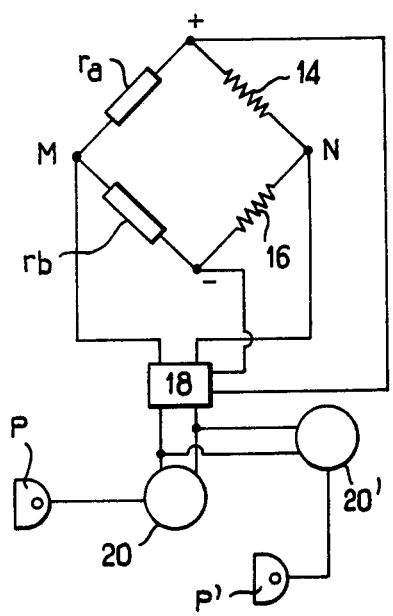
FIG. 3 is an electrical circuit diagram associated with a corrector device including only two photoelectric cells.

The description begins with a simplified embodiment of the electric circuit shown in FIG. 3 and suitable for use with a corrector device which includes only two photoelectric cells, namely the cells a and b.

The circuit then comprises a Wheatstone bridge having two adjacent branches constituted by the variable resistances $r_a$ and $r_b$ provided by the cells a and b, and whose other two branches are constituted by two fixed resistors 14 and 16. The cells a and b and the resistors 14 and 16 are chosen in such a manner that the bridge is in equilibrium when the headlamp is properly adjusted. If the bridge moves out of balance, because of a change in the ratio between the resistances of the cells a and b (e.g. because of the change of trim), an electrical voltage appears across the terminals of the output diagonal MN of the bridge. This voltage is amplified by an amplifier 18 whose output signal is applied to two actuators 20 and 20' associated with the headlamps P and P'. Depending on the sign of the voltage appearing across the terminals MN, the actuators either raise or lower the beams from said headlamps by pivoting their reflectors in the appropriate directions.

The actuators 20 and 20' may be stepper devices. If they are not constituted by stepper devices, the actuator 20' of the second projector may be controlled by a comparator for comparing the positions of the two headlamps with each other. Position comparators are well known in the art. A non-limiting example of one such comparator is described with reference to FIG. 4.

The comparator comprises two potentiometers 22 and 24 connected as a Wheatstone bridge. The sliders 26 and 28 of the potentiometers are connected to rotate with respective ones of the headlamps P and P' and thus occupy positions which depend on the angle in which each of said headlamps is pointing. The voltages present on the sliders are applied to the input terminals of an amplifier 30 whose output terminals are connected to the actuator 20' of the second headlamp. It should be observed that the actuator 20 for the other headlamp is controlled solely by the FIG. 3 circuit. The FIG. 4 circuit constitutes a means for servocontrolling the direction in which the second headlamp P' points as a function of the direction in which the first headlamp P points.

However, as already explained in the introduction to the present description, the circuit should be capable of measuring not only the ratio between the luminance at each of the points A and B in such a manner as to eliminate the influence of varying road surface reflection coefficients and variations in the intensity of the headlamp beams, but must also be capable of measuring the ratio of the luminance from the points C and B. These two ratios are simply related to each other so long as operation is normal, i.e. so long as there is no obstacle at A. Under normal conditions the circuit is intended to generate an electrical signal which varies as a function of variations in the vehicle trim, said signal controlling the actuator in such a manner as to cause the associated reflector to turn through a correction angle in the appropriate direction to return the light beam to its initial direction and thereby servocontrol the illumination provided by the headlamps to a constant direction.

However, if the above-mentioned relationship between said ratios does not hold, for example because an obstacle has appeared at A, the control means must be designed to cease giving control signals to the actuator until conditions return to normal.

FIG. 5 is an electrical circuit diagram of control means capable of comparing the above-mentioned ratios in order to perform said function, but it should be understood that the person skilled in the art can readily imagine other electrical circuits capable of performing the same function.

The electrical circuit in FIG. 5 includes a Wheatstone bridge identical to that shown in FIG. 3. The point M is connected via the coil 33 of the relay 32 and a series-connected diode 34 to a point Q which is also connected to the ends of a resistance $r_c$ representing the resistance of the photoelectric cell c and of a resistor $r_b'$. The other ends U and V of the resistances $r_c$ and $r_b'$ are connected to the terminals of the feed diagonal of the Wheatstone bridge. The resistor $r_b'$ is designed to behave in a manner substantially identical to the resistance $r_b$ of the second cell. For example, it could be constituted by a fourth cell (not shown) disposed right next to the cell b, or else, if the variations in $r_b$ are taken to be negligible, it could be constituted by a fixed resistor equal to the average value of $r_b$.

The diode 34 is connected in such a direction as to pass current only from M towards Q. Further, the relay 32 is chosen in such a manner as to behave as follows: when an electrical current tries to flow in the reverse direction QM, the diode prevents the current from flowing and the contacts 38 of the relay remain closed; when a current flows in the forward direction MQ, the relay is designed so that its contacts 38 do not open so long as the current remains below a threshold value; however, as soon as the current exceeds said threshold value, the force it generates is sufficient to pull the moving blade of the contacts 38 away from the fixed blade and thereby open the switch constituted by said contacts.

The switch 38 is connected in series in the power supply circuit to the actuators 20 and 20', which are connected in parallel to the output from the amplifier 18. As in the preceding example, the inputs to said amplifier are connected to the points M and N on the output diagonal of the Wheatstone bridge.

The resistances $r_a$, $r_b$, and $r_c$ of the cells a, b, and c are chosen in such a manner that when the headlamps are correctly pointed $r_a = r_c$ and $r_a = n \cdot r_b$, where $n > 1$, for example $n = 2$. The resistors 14 and 16 are chosen in such a manner that the Wheatstone bridge is in balance.

This electric circuit behaves in several different ways depending on the illumination states of the photocells. These states are as follows:

(1) When the headlamps are pointing in the correct direction and the vehicle is stable, the cells a, b, and c are subjected to constant illumination and $r_a/r_b = n$. The Wheatstone bridge is thus in balance and no control signals are applied to the actuators 20 and 20'.

(2) When the headlamp beam is raised, for example by virtue of the vehicle being accelerated, the directions of light detection are similarly raised and the points A, B, and C are all moved further away from the vehicle. However, since sensitivity to variations in trim increases with increasing distance from the vehicle, i.e. increases in the direction b, c, a, (as mentioned above and as demonstrated below) the illumination of the cells decreases proportionately more in the direction b, c, and a, and thus the values of the resistances increase proportionately more in the direction $r_b$, $r_c$, $r_a$, and as a consequence $r_a/r_c > 1$ and $r_a/r_b > n$. An electrical current then attempts to flow in the reverse direction Q to M, but the diode 34 prevents such current flow and the switch 38 remains closed. The voltage which appears at the measuring terminals MN of the bridge by virtue of the unbalance between $r_a$ and $r_b$ then causes corrective action to be taken by means of the amplifier 18 and the actuator 20 and 20' to lower the beam towards its proper direction so that $r_a/r_b = n$ (and incidentally $r_a/r_c = 1$).

(3) In the opposite case, the headlamp beam is lowered (for example due to the vehicle trim being altered by braking), and gives rise to the opposite conditions to those describes above, i.e. $r_a/r_c < 1$ and $r_a/r_b < n$. Current tends to flow in the direction M towards Q, and the diode 34 does not oppose current flow in this direction, however the above-mentioned threshold current is chosen to be such that the relay 32 still does not operate. Therefore the switch 38 does not open and the control signal of the output from the amplifier 18 acts on the actuator 20 and 20' in order to correct the direction in which the headlamps are pointing. It can be shown that the above-mentioned threshold current may be associated with a variation of luminance in the regions A, B, and C, such that $r_a < r_c$, i.e. $r_a/r_c = 1/k$, where $k > 1$. The following relationship therefore holds $1/k < r_a/r_c < 1$.

(4) An obstacle appears at point A regardless of the vehicle trim at that particular moment. The illumination of the cell a then increases very greatly, causing the resistance $r_a$ to drop suddenly. Regardless of the variations of $r_b$ and $r_c$ at that moment (which variations will in any case be much smaller), $r_a/r_c < 1/k$. The threshold current in the direction MQ is now exceeded, thereby opening the switch 38 of the relay 32. Thus, the control signal which would tend to apply a major and unwanted correction to the direction in which the beams are pointing (because $r_a/r_b$ becomes less than n at the same time) is not applied to the actuators 20 and 20'.

These four states are summarized in the following table.

TABLE

| Change in trim | cell illumination a | b | c | $r_a$ | $r_b$ | $r_c$ | $\frac{r_a}{r_c}$ | $\frac{r_a}{r_b}$ | behavior |
|---|---|---|---|---|---|---|---|---|---|
| none | → | → | → | → | → | → | =1 | =n | Case 1 |
| tilt up | dn | dn | dn | up | up | up | >1 | >n | Case 2 |
| tilt dn | up | up | up | dn | dn | dn | <1 & >1/k | <n | Case 3 |
| any trim + bright spot at A | up up up | x | x | dn dn dn | x | x | <1/k | <n | Case 4 |

→ = constant
up = up
dn = down
x = irrelevant

Case 1: The headlamp beam points in the proper direction. The voltage applied to the input of the amplifier is zero, and the beam direction is unaltered.

Case 2: The diode prevents current from flowing from Q towards M. The switch remains closed and the beam direction is lowered to compensate for the upward tilt in the trim.

Case 3: Current flows from M towards Q, but it is below the switch-opening threshold. The switch remains closed and the beam direction is raised to compensate for the downward tilt in the trim.

Case 4: High current flows from M towards Q, thereby operating the relay and opening its switch contacts 38. The application of wrong and very high beam raising control signals to the actuators is thus inhibited.

The present invention is illustrated by the following numerical worked example.

Begin by calculating the sensitivity $dR_A/R_A$ of the corrector at point A, where $R_A$ is the ratio $E_B/E_A$ of the vertical illuminations A and B, and where $dR_A$ is the derivative of $R_A$ relative to the trim angle $\theta$. It is known that:

$$E_A = I_A \frac{h^2}{\sin^2(\alpha + \theta + \phi)}$$

where $I_A$ is the light intensity at point A, and h is the height of the headlamp above the ground. Similarly:

$$E_B = I_B \frac{h^2}{\sin^2(\beta + \theta + \phi)}$$

where $I_B$ is the light intensity at point B.

tHe corresponding illuminations of the cells a and b are:

$$l \cdot I_A \cdot \frac{h^2}{\sin^2(\alpha + \theta + \phi)} \text{ and } m \cdot I_B \cdot \frac{h^2}{\sin^2(\beta + \theta + \phi)}$$

where l (lower case "L") and m are constants. Whence:

$$R_A = \frac{m \cdot I_B \cdot \sin^2(\alpha + \theta + \phi)}{l \cdot I_A \cdot \sin^2(\beta + \theta + \phi)}$$

simple calculation gives:

$$\frac{dR_A}{R_A} = 2 \frac{\sin(\beta - \alpha)}{\sin(\beta + \theta + \phi) \cdot \sin(\alpha + \theta + \phi)} d\theta$$

By way of numerical example, the angles $\alpha$, $\beta$, $\theta$, and $\phi$ may all be very small, so that they are equal to their sines and to their tangents (angles measured in radians).

Putting D as the protection of O on the ground, we have:
DA = 37.5 m
DB = 7.5 m
h = 0.75 m As a result, $\alpha = 0.02$ rad, $\beta = 0.1$ rad, and $\theta$ is negligibly small in comparison with $\alpha$ and $\beta$.

Assume that $d\theta = 0.01$ rad, which corresponds to a downward tilt of about 0.5°. Then, feeding in the above values:

$$\frac{dR_A}{R_A} = \frac{12}{15}$$

A similar calculation can be performed for $dR_C/R_C$ where $R_C = E_B/E_C$, giving $$\frac{dR_C}{R_C} = 2 \frac{\sin(\beta - \gamma)}{\sin(\beta + \theta + \phi) \cdot \sin(\gamma + \theta + \phi)} d\theta$$

Putting DC = 25 m and thus $\gamma = 0.03$ rad, the same change in trim $d\theta = 0.01$ rad, gives:

$$\frac{dR_C}{R_C} = \frac{7}{15}$$

It is clear that detection sensitivity at point A is greater than at point C, or in other words, that the variation in illumination due to the variation $d\theta$ in trim is greater at a distant point than it is at a near point.

This calculation thus justifies choosing the near point B as the reference point, since the sensitivity at this point can be considered as being relatively constant.

It may be observed that the sensitivities at A and C are related by the relationship:

$$\frac{dR_A}{R_A} = \frac{12}{7} \frac{dR_C}{R_C}$$

This relationship is general in character and is independent of the processing means used, and shows that it is possible to determine a threshold coefficient (in the present case greater 12/7, and for example equal to 2) which makes it possible to distinguish without ambiguity between the case where no obstacle is present at the point A and the case where an obstacle is present. Thus, the processing means may be arranged to determine the coefficient which relates the sensitivities $dR_A/R_A$ and $dR_C/R_C$ and to compare said coefficient with the threshold value. When the threshold is not reached, the correcting control signals may be applied to the actuators. Conversely, when the threshold is exceeded, as shown by the existence of an abnormal variation in intensity at A, the control of the direction in which the headlamp point is inhibited.

In the embodiment of the invention described above, the distinction between these two cases occurs with the intensity of the current flowing along the branch MQ relative to the current necessary for opening the relay contacts 38, i.e. corresponding to $r_a/r_c = 1/k$.

Figure 6:
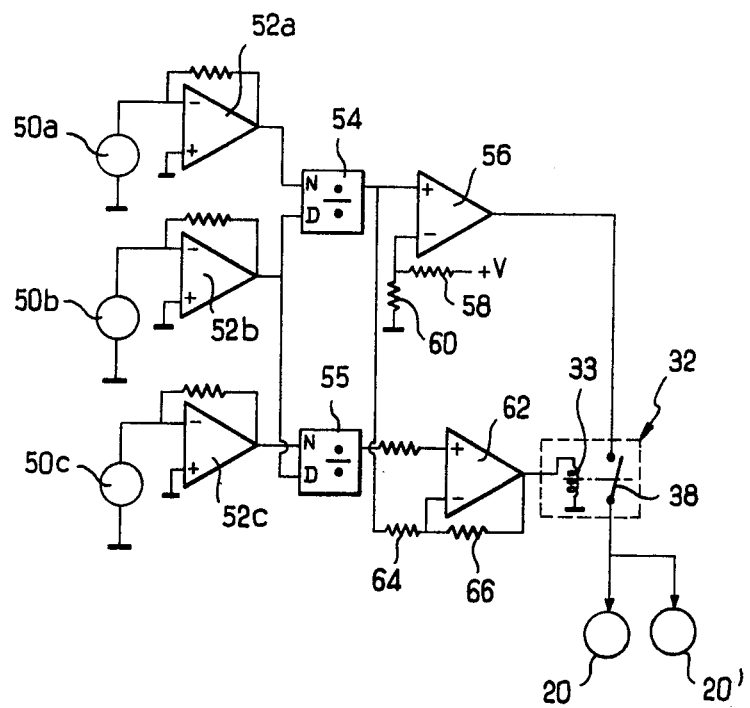
FIG. 6 is an electrical circuit diagram of a variant embodiment of the invention.

FIG. 6 is a diagram of a circuit which shows an "active" variant of the passive circuit shown in FIG. 5.

With reference to FIG. 6, the photoelectric cells corresponding to the regions A and B on the road are respectively marked 50a and 50b. These cells are of the active type, and may be constituted for example, by a semiconductor surface suitable for generating an electrical current which is proportional to the received light intensity. These currents are applied to the inputs of respective current/voltage amplifiers 52a and 52b. The output voltages from these amplifiers are respectively applied to inputs N and D of a divider circuit 54 connected to perform analog division of the voltage present on a numerator terminal N by the voltage present on a denominator terminal D. The output from the divider 54 is connected to the non-inverting input of an operational amplifier 56 which is connected as a comparator. A potential divider constituted by two resistors 58 and 60 applies a reference voltage to the inverting input of the amplifier 56. The output from the amplifier 56 controls the actuators 20 and 20' in order to change the direction in which the associated headlamps are pointed, or simply to change the directions in which their reflectors point.

This portion of the circuit operates in a manner analogous to the Wheatstone bridge circuit of FIG. 3 and serves to generate a control signal as soon as the output from the divider 54, i.e. the ratio between the output voltages from the amplifiers 52a and 52b (which is equal to the ratio between the illumination received by the associated pohotocells 50a and 50b) differs from the reference value provided by the potential divider 58, 60. The sign of the output signal from the amplifier 56 varies depending on whether said ratio is greater than or less than said reference value, so that the actuators are capable, in specific conditions explained below, of moving the headlamps in the appropriate direction as a function of the direction in which the vehicle trim varies.

The circuit further includes a third photocell 50c which is similar to the first two photocells and whose output is connected to the input of an amplifier 52c. A second divider circuit 55 has its numerator input N connected to the output from the amplifier 52c and its denominator input D connected to the output from the amplifier 52b, and after performing analog division, its output provides a voltage representative of the ratio between the illumination received by the cells 50c and 50b. An operational amplifier 62 receives the output from the divider 55 on its non-inverting input and receives the output from the divider 54 on its inverting input via a resistor 64. Another resistor 66 is connected between the inverting input and the output of the amplifier 62. The said output is also connected to the coil 33 of a relay which is referenced overall as 32, and which includes a switch 38 which is connected in series between the output from the amplifier 56 and the actuators 20 and 20'.

The purpose of this second portion of the FIG. 6 circuit is to compare the ratio between the illumination of the cells 50a and 50b as supplied by the divider 54 with the ratio between the illumination of the cells 50c and 50b, as supplied by the divider 55. More precisely, if the values $R_{64}$ and $R_{66}$ are attributed to the resistors 64 and 66, and if the output voltages from the dividers 54 and 55 are respectively proportional to the ratios $E_a/E_c$ and $E_c/E_b$, where $E_a$, $E_b$, and $E_c$ designate the illumination of the cells 50a, and 50b, and 50c, respectively, it is easily shown that the output voltage from the amplifier 62 changes sign when:

$$E_c/E_b = R_a/E_b \times R_{66}/(R_{64}+R_{66})$$

i.e.

$$E_a/E_c = (R_{66}+R_{66})/R_{66}$$

From which it can be deduced that when a luminous obstacle appears in the line of sight of photocell 50a, the significant increase in $E_a$ causes the output voltage from the amplifier 62 to change sign, which therefore cases the relay 32 to open its switch contact 38.

Naturally, the invention is not limited to the two embodiments described above, but includes any variation that falls within the scope of the claims. In particular, numerous other kinds of calculator means may be inserted between the photoelectric cells and the actuators, for example a microprocessor system could be inserted therebetween thereby making it possible to take all kinds of special conditions specific to the various cells to be taken into consideration.

I claim:

1. A device for automatically correcting the beam direction of a vehicle headlamp when the trim of said vehicle changes, said device comprising:

an illumination sensor integrated in the vehicle headlamp and fixed to move therewith, said sensor being disposed to detect the luminance of the road in at least one direction at a predetermined angle with the horizontal, said luminance being detected in a region of the road lying in the field illuminated by the headlamp, and said sensor being suitable for generating a signal representative of said detected luminance;

an actuator for varying the inclination of the headlamp sensor assembly relative to the vehicle; and processor means for generating an actuator control signal as a function of the signal generated by said sensor, in such a manner as to servocontrol sdaid region of the road to have constant luminance.

2. A device according to claim 1, wherein the illumination sensor comprises a converging lens and at least one photoelectric cell disposed in the image focal plane of said lens at the image point of said region of the road.

3. A set of headlamps for a motor vehicle, characterized in that it includes a device according to claim 2.

4. A device according to claim 2, wherein the sensor comprises two photoelectric cells respectively situated at the image points of two regions of the road, respectively constituting a far region and a near region relative to the vehicle.

5. A set of headlamps for a motor vehicle, characterized in that it includes a device according to claim 4.

6. A device according to claim 4, wherein the sensor includes a third photoelectric cell, situated at the image point of a third region situated between said far region and said near region.

7. A set of headlamps for a motor vehicle, characterized in that it includes a device according to claim 6.

8. A device according to claim 6, wherein the processing means are arranged to inhibit actuator control when the ratio between the illumination of the first and the third cells is greater than a threshold value.

9. A set of headlamps for a motor vehicle, characterized in that it includes a device according to claim 8.

10. A device according to claim 8, wherein the photoelectric cells are of the photo-resistive type, and wherein the processing means comprise a Wheatstone bridge having two adjacent arms constituted by the first two cells and whose other two arms are constituted by fixed resistors chosen in such a manner that when the headlamp is pointing in the correct direction, the Wheatstone bridge is in balance, said processing means further including an amplifier connected between the measuring output of the Wheatstone bridge and the actuator.

11. A set of headlamps for a motor vehicle, characterized in that it includes a device according to claim 10.

12. A device according to claim 10, wherein the processing means further include a relay whose coil is connected in a circuit through which there passes a current representative of the ratio between the electrical resistances of the first and third cells, said relay being connected to inhibit operation of the actuator when said current exceeds a threshold value.

13. A set of headlamps for a motor vehicle, characterized in that it includes a device according to claim 12.

14. A device according to claim 8, wherein the photoelectric cells are of the active type, and wherein the processor means comprise a divider circuit for performing analog division between the voltages provided by the first and second cells, and a comparator circuit for comparing the output from the divider circuit with a reference voltage, the output from said comparator circuit being connected to control the actuator.

15. A set of headlamps for a motor vehicle, characterized in that it includes a device according to claim 14.

16. A device according to claim 14, wherein the processor means further include a second divider circuit for performing division between the voltages provided by the second and third cells, and a second comparator circuit for comparing the voltages provided by the first and second divider circuits, the output from the second comparator circuit controlling a relay suitable for selectively inhibiting and enabling control of the actuator by said first comparator.

17. A set of headlamps for a motor vehicle, characterized in that it includes a device according to claim 16.

18. A device according to claim 6, wherein the three photoelectric cells are in the form of elongate horizontal and parallel strips coinciding with the images of three respective transversal strips of the road, with the width of said regions of the road being equal to the width of the path followed by the vehicle.

19. A set of headlamps for a motor vehicle, characterized in that it includes a device according to claim 18.

20. A device according to claim 1, wherein the processing means also control an actuator suitable for varying the inclination of the vehicle's other headlamp.

21. A set of headlamps for a motor vehicle, characterized in that it includes a device according to claim 20.

22. A device according to claim 20, wherein said actuators are stepper motors.

23. A set of headlamps for a motor vehicle, characterized in that it includes a device according to claim 22.

24. A device according to claim 20, wherein the actuators are DC motors, and wherein the processing means also include means for servocontrolling the two headlamps to the same inclination.

25. A set of headlamps for a motor vehicle, characterzed in that it includes a device according to claim 24.

26. A device according to claim 24, wherein the servocontrol means comprise potentiometers connected in a Wheatstone bridge configuration, with the sliders of said potentiometers being mechanically disposed to rotate with said headlamps.

27. A set of headlamps for a motor vehicle, characterized in that it includes a device according to claim 26.

28. A device according to claim 1, wherein the, or each, actuator is suitable for changing the inclination solely of the reflectors of the associated headlamps.

29. A set of headlamps for a motor vehicle, characterized in that it includes a device according to claim 28.

30. A set of headlamps for a motor vehicle, characterized in that it includes a device according to claim 1.

* * * * *